(12) United States Patent
Subramanian

(10) Patent No.: US 8,849,905 B2
(45) Date of Patent: Sep. 30, 2014

(54) CENTRALIZED COMPUTING

(71) Applicant: gridCore AB, Gothenburg (SE)

(72) Inventor: Devarajan Subramanian, Gothenburg (SE)

(73) Assignee: GridCore AB, Gothenburg (SE)

( * ) Notice: Subject to any disclaimer, the term of this patent is extended or adjusted under 35 U.S.C. 154(b) by 145 days.

(21) Appl. No.: 13/663,034

(22) Filed: Oct. 29, 2012

(65) Prior Publication Data

US 2014/0122565 A1    May 1, 2014

(51) Int. Cl.
*G06F 15/16* (2006.01)
*H04L 12/24* (2006.01)
*G06F 9/50* (2006.01)

(52) U.S. Cl.
CPC .......... *H04L 41/5096* (2013.01); *G06F 9/5072* (2013.01)
USPC ........... 709/203; 709/223; 709/225; 709/226; 709/227

(58) Field of Classification Search
CPC .. H04L 69/329; H04L 41/5096; G06F 9/5072
USPC ................. 709/200–203, 217–227
See application file for complete search history.

(56) References Cited

U.S. PATENT DOCUMENTS

| | | | | |
|---|---|---|---|---|
| 6,098,108 | A * | 8/2000 | Sridhar et al. | 709/239 |
| 6,324,582 | B1 * | 11/2001 | Sridhar et al. | 709/230 |
| 8,370,856 | B2 * | 2/2013 | Peterson | 719/320 |
| 8,555,274 | B1 * | 10/2013 | Chawla et al. | 718/1 |
| 2010/0115532 | A1 * | 5/2010 | Peterson | 719/320 |
| 2011/0106883 | A1 * | 5/2011 | Gupta et al. | 709/203 |
| 2012/0239729 | A1 * | 9/2012 | Hefter | 709/203 |
| 2013/0018939 | A1 * | 1/2013 | Chawla et al. | 709/203 |
| 2013/0212294 | A1 * | 8/2013 | Pagan | 709/231 |
| 2013/0275973 | A1 * | 10/2013 | Greenfield et al. | 718/1 |
| 2013/0304797 | A1 * | 11/2013 | Warren et al. | 709/203 |
| 2014/0128053 | A1 * | 5/2014 | Merchant | 455/419 |

* cited by examiner

*Primary Examiner* — Moustafa M Meky
(74) *Attorney, Agent, or Firm* — Harness, Dickey & Pierce, PLC

(57) ABSTRACT

A centralized computing system, comprising a centralized computing center comprising a plurality of nodes, a plurality of clients in different geographical regions, an IP network interconnecting the clients and the centralized computing center, and a scheduler scheduling jobs onto suitable nodes. The plurality of nodes include desktop container nodes, exclusively used for running remote desktop server software, each remote desktop server software communicating visual output to a remote desktop viewer on one of the clients. The system further comprises an accelerator arrangement capable of providing communication of visual output between the desktop container nodes and the clients using an alternative transport layer protocol other than transmission control protocol (TCP), the alternative transport layer protocol being more efficient than TCP over a high-latency connection.

13 Claims, 3 Drawing Sheets

CENTRALIZED COMPUTING

FIELD

The present invention relates to a centralized computing, and more specifically to a system with a centralized computing centre having a plurality of nodes, a plurality of clients, an IP network interconnecting the clients and the centralized computing centre, and a scheduler scheduling jobs from the clients onto suitable nodes.

BACKGROUND

In many computing tasks requiring significant computing power, such as complex calculations or graphical simulations, there is a need to use computer clusters including many computers. The Internet and constantly improved bandwidth has made it possible to access such computer clusters, sometimes referred to as computing centres, remotely, and there is thus a desire to centralize such computing centres, and to locate them where the associated costs are low. Ideal locations should have e.g. a cool climate (requiring less cooling), affordable electricity prices, and low rent. Another advantage of centralizing the computing centres is that is allows increased security.

However, although bandwidth can generally be increased almost infinitively, there is a problem of high latency over long distance connections. This problem is difficult to completely eliminate with current networking technology.

Another factor influencing the requirement on centralized computing centres is the development of remote desktops. Remote desktops were initially developed to provide support to end users and in certain cases, for running a computer aided engineering (CAE) application with its native interface inside a local area network (LAN). The remote desktops allow engineers in different locations to access a single data centre within the organization, and to work from any part of the globe (on a thin client), similar to how they do on their local workstation or within a LAN. With engineering teams of a single organization spread across the globe, and high-end graphics demand of today's CAE applications, it is becoming increasingly difficult to sustain satisfactory performance of such centralized data and computing centres.

Conventionally, a centralized computing centre, e.g. a high performance computing (HPC) centre, is handled by a so called master node, running a resource scheduler and one or several remote desktop applications. This is an inflexible design, lending little possibility to optimize the scheduling of desktop applications.

Further, the centralized computing resources (cluster nodes) in a cluster) are generally heterogeneous, catering to different needs for different applications. Also, applications with different resource requirements often need to interface with each other during run-time. Obviously, the more users that access the same computing centre, the more difficult it gets to share the scarce resources (e.g. graphics capable computers) between them in an efficient manner.

For all these reasons, the centralized computing resources of an organization have traditionally been more geographically dispersed than what is in fact optimal from a cost and efficiency point of view. For example, it becomes increasingly difficult to optimally utilize the centralized computing resources. Sometimes, resources at a computing centre are idling with very few jobs running, while at the same time, there is a high demand for resources at another centre where many jobs are waiting in queue. Although engineers would like to use the idling resources, high latencies and practicalities involved with submitting a job, prevent them from doing this.

Centralized computing centres will also provide capabilities to grow and shrink resources at one central location, in other words, this can lead to the creation of a "CAE cloud".

BRIEF SUMMARY OF THE INVENTION

In view of the above, it is an object with the present invention to overcome some of the above mentioned problems, and to allow an organization to have engineering teams located in any part of the globe access and use a centralized computing centre in a satisfactory manner. It is a further object to provide efficient scheduling of a large number of remote desktops onto the resources of a centralized computing centre.

These and other objects are achieved by a centralized computing system, comprising a centralized computing centre comprising a plurality of nodes, including visualization nodes having hardware suitable for graphics rendering and computation nodes having CPUs suitable for extensive computation, a plurality of clients in different geographical regions, each allowing visual access to at least one of the nodes and adapted to request a job intended to be executed on the centralized computing centre, an IP network interconnecting the clients and the centralized computing centre, and a scheduler scheduling the job onto suitable node(s), and launching an application required to execute the job on the suitable node(s). The plurality of nodes also include desktop container nodes, used for running remote desktop server software, each remote desktop server software communicating visual output to a remote desktop viewer on one of the clients, and the system further comprises an accelerator arrangement capable of providing communication of visual output between the desktop container nodes and the clients using an alternative transport layer protocol other than transmission control protocol (TCP), said alternative transport layer protocol being more efficient than TCP over a high-latency connection.

By a "high latency connection" in the present context is intended a network connection where the round trip time (RTT) negatively affects the throughput time of data to such an extent that it is noticeable to the user. For example, a RTT greater than 100 ms, or even greater than 50 ms, may be considered to represent a high latency connection.

Compared to the conventional, static solution with a master node running the scheduler and one or several remote desktop applications, the scheduler has thus been separated from the remote desktop node(s), providing a more dynamic system layout. The remote desktop nodes are used primarily for remote desktop server software. The number of desktop container nodes can therefore be less powerful than visualization nodes and computation nodes, and their number may be increased at reasonable cost, making it possible to optimize scheduling and computing capacity utilization.

The centralized computing system makes it possible for the engineers to perform their work (such as simulations) with the native GUI (graphical user interface) of their CAE applications, similar to how they would on their local powerful graphics computers. Making the application export its display to the remote desktop from the visualization node allows the application to start with its GUI. Many of the CAE applications provide batch and graphical interactive use. In batch mode there is no GUI, and the application simply starts and performs its calculations and exits. The users cannot visually see what is happening. In graphical interactive mode, however, these applications have tools to visualize the data being generated, example, graphs, 3D images and so on.

According to one embodiment, the accelerator arrangement includes an accelerator server component associated with the remote desktop server software, and an accelerator client component associated with the remote desktop viewer. These accelerator components are configured to act as proxies, interfacing with the remote desktop server and remote desktop client and providing communication using the alternative transport layer protocol between the first and second acceleration components.

Such a design allows the remote desktop application (server and viewer) to work in a conventional manner, while the long distance communication of visual data is less vulnerable to high latency.

The accelerator components may be arranged to activate the alternative transport layer protocol communication only when TCP-based communication is found inappropriate. Such selective activation of the acceleration optimizes processing capacity.

In order to determine when to use the alternative transport layer protocol, and optimize the acceleration arrangement in general, the acceleration arrangement may comprise a response time estimator module, arranged to determine a round trip time between the client and the desktop container node. The round trip time can then be used by the accelerator arrangement to decide when to activate said alternative transport layer protocol communication.

In a preferred embodiment of the invention, the communication of visual output is provided by means of reliable UDP, which provides a suitable mix of reduced processing at network interface level, and dynamic congestion control. An example is the UDP Data Transfer (UDT) protocol, which is based on UDP and includes congestion control and reliability mechanisms.

The acceleration arrangement can further be arranged to send a frame buffer update request to the remote desktop server software before such a request is received from said remote desktop viewer. The response from such a request will be "pre-fetched", and may be cached by the acceleration arrangement.

According to further embodiments of the invention, the scheduler is arranged to apply various policies governing the access to the high performance processing nodes. Such policies include efficient licensing handling, identification and handling of hybrid jobs, identification and handling of exclusive jobs.

BRIEF DESCRIPTION OF THE DRAWINGS

Currently preferred embodiments of the invention will now be described in more detail with reference to the very schematic drawings.

DETAILED DESCRIPTION OF THE INVENTION

System Layout

Figure 1:
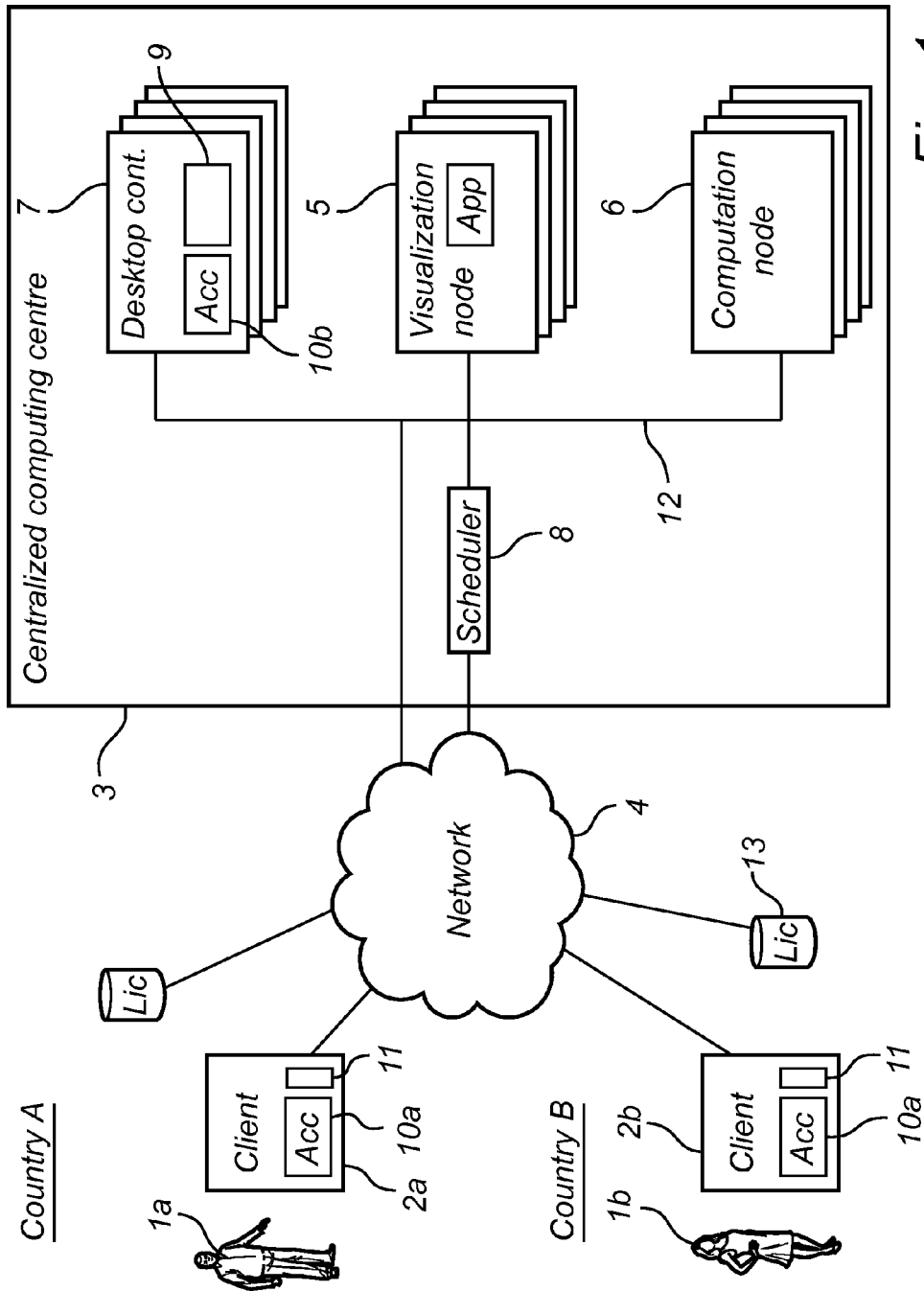
FIG. 1 is an overview block diagram of a HPC system according to an embodiment of the present invention.

The centralized computing system illustrated in FIG. 1 includes two users 1a, 1b, located in different geographic locations, here different countries A and B, and using clients 2a, 2b to access a centralized computing centre 3 (here referred to as a High Performance Computing (HPC) centre) over a network 4. Of course, the number of users is typically significantly greater than two, but is here limited for reasons of simplicity and clarity.

The clients 2a, 2b are typically so called "thin" client, indicating that they do not have any significant processing power, and they can thus be any standard computer such as a portable laptop or even tablet computer. However, the client may of course also be a more powerful computer. The clients are adapted to allow their users remote visual access to resources in the HPC centre by a remote desktop. Using the remote desktop, the user may submit to the HPC centre computing jobs requiring high performance computing resources, such as heavy computations or graphics. As an example, computer aided engineering (CAE) may involve graphically illustrating movement of complex 3D models, and/or digital mock-up of composite 3D models.

The HPC centre 3 has a plurality of different high performance processing resources, or nodes. In the illustrated example, the resources include (at least) visualization nodes 5, and computation nodes 6. The visualization nodes and computation nodes run applications to execute jobs launched by the clients. The visualization nodes are graphics capable computers, e.g. workstations or servers having a powerful hardware graphics accelerator(s), typically called a graphics card, for performing 2D/3D graphics rendering. Such a graphics card can be capable of handling standards like OpenGL, DirectX etc. Examples of graphics cards include NVIDIA QUADRO 2000, 4000, 6000, Tesla M2070Q, and AMD V7900. The computation nodes are typically computers having fast CPUs with multiple cores, high speed memory and in some instances, extremely fast disks or even SSD drives. The HPC centre further includes a scheduler 8, arranged to schedule the access of various clients (here the two clients 2a, 2b, to the various HPC resources. Optionally, the HPC centre may include one or several backup schedulers for redundancy.

The resources in the HPC centre 3 are preferably connected by interconnects 12 that are characterized by high bandwidth and low latency, such as Infiniband.

The network 4 is an IP (Internet protocol) network, and typically includes the Internet. It may also include the local area network (LAN) of the organization the users belong to. Communication over the network may be open, but may also be secure, encrypted communication, e.g. via a VPN (Virtual Private Network) tunnel. The transport layer may employ different protocols. Communication of visual output such as remote desktop access conventionally uses the transmission control protocol (TCP), while file transfer sometimes uses the User Datagram Protocol (UDP).

Compared to many transport layer protocols, such as TCP and SCTP, UDP has less protocol mechanisms, which reduces the overhead of such processing at the network interface level, but at the same time exposes any unreliability of the underlying network protocol. For situations where some control is required, but not to the cost of too much overhead, a more reliable UDP mechanism has been developed. These mechanisms extend UDP by adding acknowledgment of received packets, windowing and flow control, retransmission of lost packets and over-buffering.

One example of reliable UDP is UDP Data Transport (UDT). UDT is built on top of User Datagram Protocol (UDP) by adding congestion control and reliability control mechanisms. UDT is an application level, connection oriented, duplex protocol that supports both reliable data streaming and partial reliable messaging.

Desktop Containers

In addition to the powerful processing nodes 5, 6 for visualization and computation, the resources of the HPC centre includes a further category of nodes referred to as "desktop containers" 7. The desktop containers nodes 7 are primarily used to run the server software 9 of a remote desktop application. This server software 9 typically does not require the high performance processing capacity available in other nodes, such as visualization nodes 5 or computation nodes 6 and may be less powerful computers, without special processing capabilities such as graphics cards and high performance CPUs. By using the desktop nodes for running these applications, the capacity of the more powerful nodes is reserved for where it is actually needed. It is noted that a single desktop container node may run several remote desktop applications 9.

The remote desktop application may be a virtual network computing (VNC) application, in which case the remote desktop server 9 on the desktop container is a VNC server, and the client runs a VNC client (or viewer) 11. The server 9 passively allows the viewer 11 to take control of it. The viewer 11 watches, controls, and interacts with the server 9. The viewer 11 controls the server 9. A VNC system uses a TCP based protocol called remote framebuffer (RFB).

License Servers

To each geographic region (e.g. a country) there is optionally associated a license server 13, storing information about which licenses are available to users in that particular region. The license servers can be accessed by the scheduler 8 in order to determine if a user is entitled to launch a further instance of a particular application.

Operation of the System

Figure 2:
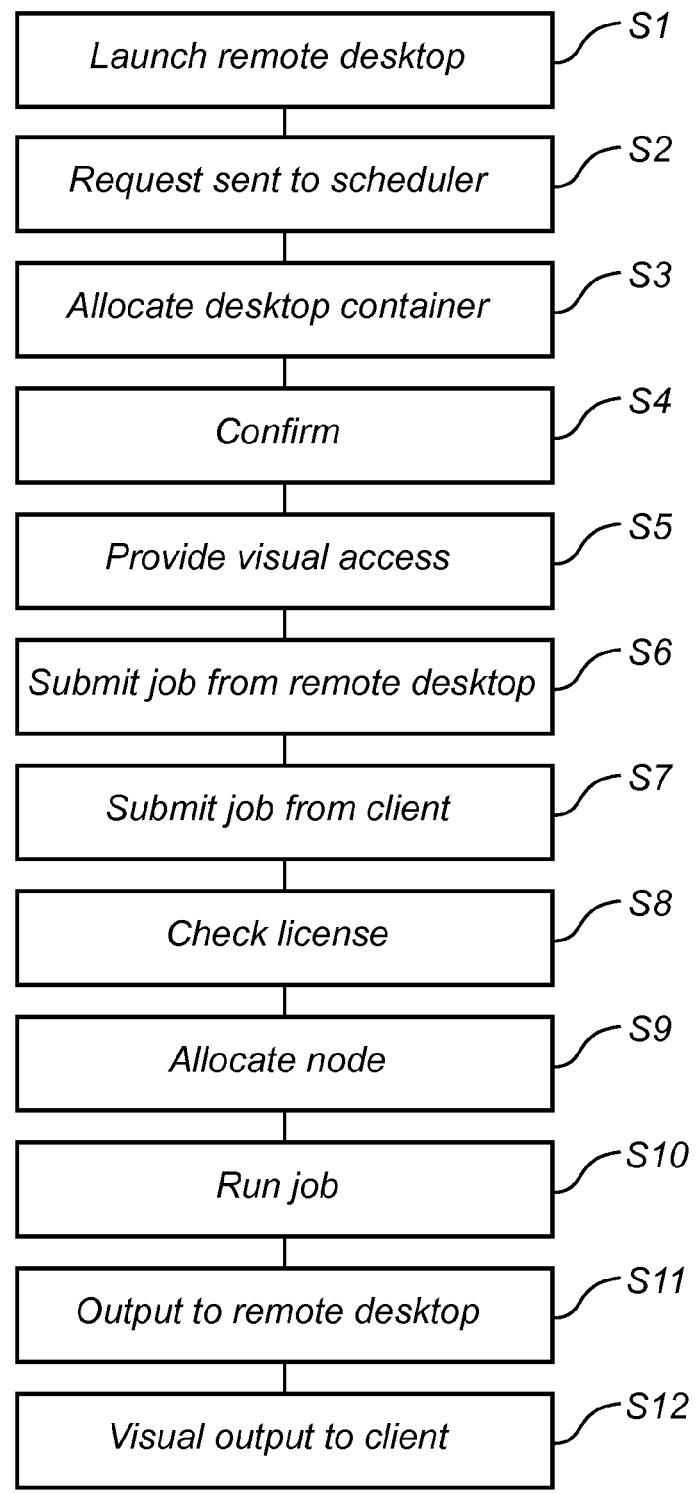
FIG. 2 is a flow chart of an example of operation of the system in FIG. 1.

With continued reference to FIG. 1, but also with reference to FIG. 2, an example of operation of the system in FIG. 1 will now be described in more detail.

In a first sequence, a user initiates (S1) remote desktop application on the client, and a request is then sent (S2) to the scheduler. The scheduler allocates (S3) the request to a desktop container node having available capacity for launching an additional remote desktop application. When the application is running, a confirmation is sent (S4) from the desktop container node, via the scheduler, back to the client, and the client provides (S5) the user with visual access to the remote desktop.

In a second sequence, the user submits a job. The job can be started from within the remote desktop (S6), or from the thin client (S7) with information to the scheduler that the graphics of this job should be displayed inside the remote desktop. Based on the type of job, the scheduler determines which application will be required, and what license features are required for that specific run of the application, and then sends (S8) a license availability check to a license server in the geographical region of the user. Provided that the required license is available, the scheduler then proceeds to allocate (S9) a high performance processing node suitable for the job.

Step S9 includes an assessment by the scheduler 8 of what resources will be required by the job. Depending on this assessment, the allocated node may be a visualization node 5, or a computation node 6, based on whether the job primarily requires remote visualization capability or high power CPU processing.

The scheduler may also determine that execution of the job requires a combination of both visualization and computation, sometimes referred to as a "hybrid" job. As an example, consider an application which is capable of parallel processing by distributing its work load onto multiple nodes using techniques such as MPI (Message Passing Interface). Further, let us assume that this application has a graphical component, i.e. a component with a GUI (Graphical User Interface) which requires an OpenGL capable graphics card for 2D/3D rendering. For optimal utilization of resources, the scheduler 8 will place the GUI component on a visualization node 5 with an OpenGL graphics card, the display is exported to a remote desktop 9 on a desktop container node 7 and the computation or MPI portion of the application is placed on one or several computation nodes 6. This way, the system utilizes only limited resources on the visualization node 5 leaving it available for potential use by other users. Such intelligent optimization allows effective utilization of the heterogeneous HPC resources available to an organization.

The scheduling in step S9 may also be arranged to identify if the job requires exclusive access to one of the nodes, a so called "exclusive job". In this case, the scheduler waits until a node is completely free, and then schedules the job onto this node. The node is reserved exclusively for this job until the job is complete. For exclusive jobs, it may be preferable that also the remote desktop server software runs on the high performance node, i.e. on a visualization node 5 or computation node 6.

In order to further improve scheduling, the scheduler 8 may be arranged to monitor the processing load of individual graphics cards in the visualization nodes. This enables the scheduler to schedule a job onto a node which has sufficient free capacity on its graphics card.

Returning to FIG. 2, in a third sequence, the application is started on the allocated node, and the job is run (S10). When the application is started, standard display exporting mechanisms, such as Linux X, can be used to direct the graphical output to the remote desktop application running on the allocated desktop container (S11). This information can be set by the scheduler 8 as part of the job launching process (S10). Finally, the visual output on the remote desktop is communicated (S12) back to the client via the network 4.

In a situation where a user has already launched a remote desktop, and thus has an allocated desktop container node, the process of submitting a job becomes easier. Basically, the user already has visual access (S5), the user can start with step S6/S7 and provide the details of the existing desktop container to the scheduler 8.

Acceleration Arrangement

According to the present invention, a more optimized use of available protocols in the transport layer is made possible by a novel acceleration arrangement, including an accelerator client component 10a provided at the client 1a, and an accelerator server component 10b provided at the desktop container node 7. (For reasons of simplicity only one pair of accelerator components is illustrated, but the skilled reader will realize that such components are available at all clients and at all remote desktop nodes.)

The accelerator components 10a, 10b are adapted to intervene in the communication between the remote desktop viewer at the client and the remote desktop server, in cases where TCP based communication is inadequate (e.g. in cases of high network latency). The acceleration components are configured to interface with the remote desktop server and the remote desktop viewer using the conventional, typically TCP-based, protocol of the remote desktop application, but will selectively communicate with each other using an alternative transport layer protocol, preferably a reliable UDP mechanism, such as UDP Data Transfer (UDT). By using reliable UDP, problems of high latency are eliminated, or at least ameliorated. The accelerator components 10a, 10b will thus act as proxies between the remote desktop viewer and remote desktop and handle the network communication.

Figure 3:
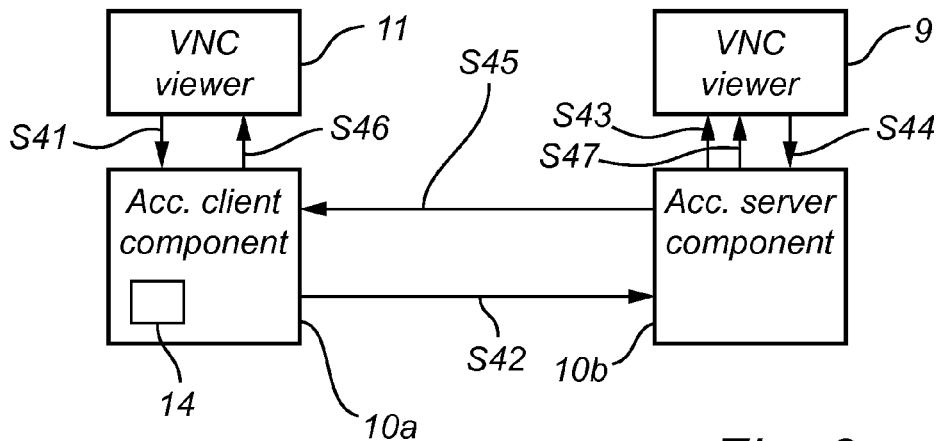
FIG. 3 is a block diagram illustrating an embodiment of the accelerator arrangement in FIG. 1.

A specific example is illustrated in FIG. 3, showing a VNC based remote desktop application. On the client side, an accelerator client component 10a is associated with a VNC client 11, and on the desktop container side an accelerator server component 10b is associated with a VNC server 9. During operation, a FrameBufferUpdate Request is sent (S41) from the VNC viewer 11 to the accelerator client component 10a via TCP (using the RFB protocol mentioned above). The request is then sent (S42) to the accelerator server component using TCP or reliable UDP, depending on the conditions. From the accelerator sever component 10b, the request is finally sent (S43) to the VNC server using TCP. In step S44, a FrameBufferUpdate Response is returned to the acceleration server component 10b from the VNC server, using TCP. The response is returned (S45) back to the accelerator client component 10a, again using TCP or reliable UDP, depending on the conditions. Finally, the response is returned to the VCN viewer 11 using TCP.

To summarize the function of the accelerator arrangement, the accelerator components 10a, 10b will communicate with the VNC server and VNC viewer using TCP, while communication between the accelerator components 10a, 10b will selectively be reliable UDP.

In some applications, such as when a VNC remote desktop application is used, the remote desktop server returns frame buffer updates to the viewer only when the viewer requests such updates. This may cause performance degradation over high latency links. In order to avoid such problems, the acceleration arrangement may include a pre-fetching mechanism. Again with reference to FIG. 3, the accelerator server component 10b is then configured to resend (S47) a previous FrameBufferUpdate Request to the VNC server 9 as soon as the response has been sent to the client side in step S45. Any response from such a request is cached for later transmission to the client side.

The intervention of the acceleration arrangement will require a certain amount of processing, thus consuming CPU time. If latency is low, there is no need to add this processing overhead. In order to further optimize the operation of the acceleration arrangement, the accelerator client component 10a may therefore include a round trip time (RTT) estimator module 14, arranged to determine the round trip response time, e.g. based on a ping sent from the client to the desktop container. Based on the RTT, the accelerator module 10a can select an appropriate level of acceleration.

Figure 4:
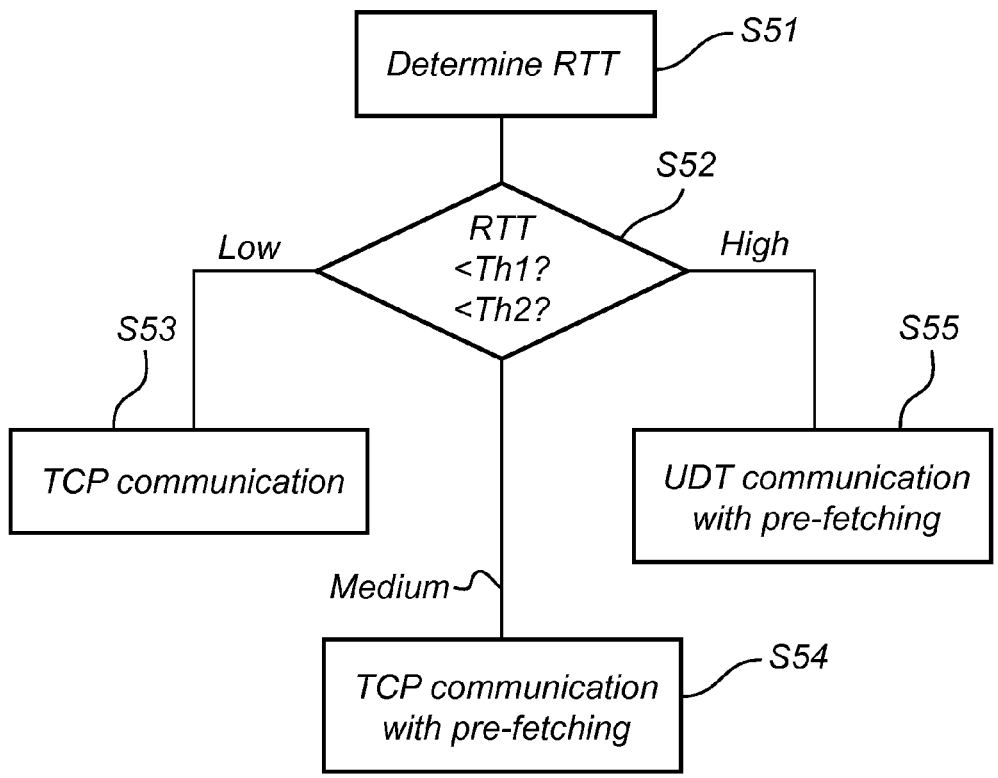
FIG. 4 is a flow chart illustrating further details of the operation of the accelerator arrangement in FIG. 4.

An example of such processing is illustrated in FIG. 4. First, in step S51, the client 1a determines the round trip time (RTT) to the desktop container 7. The RTT is then (step S52) compared with two threshold values Th1 and Th2, to establish if it is low (RTT<Th1), medium (Th1<RTT<Th2) or high (RTT>Th2). The threshold values are selected based on the implementation and circumstances. As an example, Th1 can be 100 ms and Th2 can be 150 ms.

If latency is low (i.e. RTT<Th1), the process proceeds to step S53, where the accelerator arrangement is disabled and communication will be performed directly between the remote desktop viewer 11 and the remote desktop server 9. If latency is medium (i.e. Th1<RTT<Th2), the process continues to step S54, where again the accelerator arrangement is set up to proxy remote desktop traffic over TCP, but this time also activating the pre-fetching mechanism described above with reference to FIG. 4. If latency is high (i.e. RTT>Th2), the process control continues to step S55, where the accelerator arrangement is set up to proxy remote desktop traffic over an alternative transport layer protocol, such as UDT, again activating the pre-fetching mechanism.

It is noted that the present invention by no means is limited to the examples described above. On the contrary, many modifications and variations are possible within the scope of the appended claims. For example, the system in FIG. 1 may include additional elements and additional functionality, such as login systems, databases, etc. The functions described above may be realized in software, but may also be implemented partly or entirely in hardware. The specific standards and protocols mentioned are intended only as examples, and may be substituted by other solutions providing comparable functionality.

What is claimed is:

1. A centralized computing system, comprising:
   a centralized computing centre comprising a plurality of nodes, including visualization nodes having hardware suitable for graphics rendering and computation nodes having CPUs suitable for extensive computation;
   a plurality of clients in different geographical regions, each allowing visual access to at least one of said nodes and adapted to request a job intended to be executed on said centralized computing centre; and
   an IP network interconnecting said clients and said centralized computing centre,
   a scheduler scheduling said job onto a suitable one of said nodes, and launching an application required to execute said job on said suitable node;
   wherein said plurality of nodes also include desktop container nodes, used for running remote desktop server software, each remote desktop server software communicating visual output to a remote desktop viewer on one of said clients;
   and wherein said system further comprises an accelerator arrangement capable of providing communication of visual output between said desktop container nodes and said clients using an alternative transport layer protocol other than transmission control protocol (TCP), said alternative transport layer protocol being more efficient than TCP over a high-latency connection.

2. The system of claim 1, wherein said accelerator arrangement includes an accelerator server component associated with the remote desktop server software, and an accelerator client component associated with the remote desktop viewer, said accelerator components configured to act as proxies, interfacing with the remote desktop server and remote desktop client and providing communication using said alternative transport layer protocol between the first and second acceleration component.

3. The system of claim 2, wherein said accelerator components are arranged to activate said communication using said alternative transport layer protocol only when TCP-based communication is found inappropriate.

4. The system of claim 1, wherein said acceleration arrangement comprises a response time estimator module, arranged to determine a round trip response time between the client and the desktop container node, said round trip response time being used by said accelerator arrangement to decide when to activate said alternative transport layer protocol communication.

5. The system of claim 1, wherein said alternative transport layer protocol is based on UDP and includes congestion control.

6. The system of claim 1, wherein said acceleration arrangement is further arranged to send a frame buffer update request to said remote desktop server software before such a request is received from said remote desktop viewer.

7. The system according to claim 1, wherein said scheduler, before launching said application, accesses a license server to verify that a license for an application required for said job, which license is valid for the geographical region of said user, is available.

8. The system according to claim 1, wherein said scheduler is further arranged to monitor a load of each graphics rendering hardware, and to schedule a job to a particular visualization node in dependence on said load.

9. The system in claim 1, wherein said scheduler is arranged to identify said job as a hybrid job which requires both a visualization node and a computation node to be executed, and to schedule said hybrid job on at least one visualization node and at least one computation node.

10. The system in claim 1, wherein said scheduler is arranged to identify said job as an exclusive job which requires full power of a node, and to reserve one of said nodes for execution of only said exclusive job.

11. The system in claim 1, wherein said hardware for graphics rendering is capable of handling at least one of OpenGL and DirectX.

12. The system of claim 1, wherein said remote desktop server software is a Virtual Network Computing (VNC) application.

13. A method for centralized computing in a system comprising a centralized computing centre comprising a plurality of nodes, including visualization nodes having hardware suitable for graphics rendering and computation nodes having CPUs suitable for extensive computation, and a plurality of clients in different geographical regions, comprising:

interconnecting said clients and said centralized computing centre with an IP network;

running remote desktop viewers on said clients;

running remote desktop server software on nodes other than said visualization nodes and said computation nodes;

communicating visual output from said remote desktop server software to one of said remote desktop viewers; and selectively communicating said visual output using an alternative transport layer protocol other than transmission control protocol (TCP), said alternative transport layer protocol being more efficient than TCP over a high-latency connection.

* * * * *